(12) United States Patent
Trebbi et al.

(10) Patent No.: US 8,455,773 B2
(45) Date of Patent: Jun. 4, 2013

(54) APPARATUS AND METHOD FOR WEIGHING CONTAINERS

(75) Inventors: Claudio Trebbi, Medicina (IT); Gabriele Gabusi, Castenaso (IT)

(73) Assignee: IMA Life S.r.l. (IT)

( * ) Notice: Subject to any disclaimer, the term of this patent is extended or adjusted under 35 U.S.C. 154(b) by 299 days.

(21) Appl. No.: 12/679,603

(22) PCT Filed: Sep. 23, 2008

(86) PCT No.: PCT/IB2008/002485
§ 371 (c)(1),
(2), (4) Date: Mar. 23, 2010

(87) PCT Pub. No.: WO2009/040634
PCT Pub. Date: Apr. 2, 2009

(65) Prior Publication Data
US 2010/0200306 A1    Aug. 12, 2010

(30) Foreign Application Priority Data

Sep. 24, 2007  (IT) .............................. BO2007A0641

(51) Int. Cl.
*B65B 1/46* (2006.01)
*B65B 1/32* (2006.01)
*G01G 9/00* (2006.01)

(52) U.S. Cl.
USPC ............................................ 177/145; 141/83

(58) Field of Classification Search
USPC ............................................ 177/145; 141/83
See application file for complete search history.

(56) References Cited

U.S. PATENT DOCUMENTS

| 3,333,648 | A | | 8/1967 | Dodd | |
|---|---|---|---|---|---|
| 5,236,337 | A | * | 8/1993 | Kikuchi et al. | 177/52 |
| 7,140,403 | B2 | * | 11/2006 | Gamberini | 141/83 |
| 2005/0230000 | A1 | * | 10/2005 | Gamberini | 141/83 |

FOREIGN PATENT DOCUMENTS

| EP | 0501208 A1 | 9/1992 |
|---|---|---|
| WO | 2007003407 A1 | 1/2007 |

* cited by examiner

*Primary Examiner* — Randy W Gibson
(74) *Attorney, Agent, or Firm* — Laubscher & Laubscher, P.C.

(57) ABSTRACT

An apparatus for weighing containers moved by a transporting arrangement along a path in a weighing station includes a transferring arrangement for transferring containers from the transporting arrangement to the weighing station and vice versa. The transferring arrangement is driven so as to move at least a container to be weighed away from an upstream row of containers for taking at least a container to be weighed to the weighing station, maintaining the container to be weighed in the weighing station for a time necessary for detecting the weight of the container to be weighed, and moving the weighed container towards a downstream row of containers.

32 Claims, 3 Drawing Sheets

APPARATUS AND METHOD FOR WEIGHING CONTAINERS

This application is a continuation of PCT International Application No. PCT/IB2008/002485 filed Sep. 23, 2008. PCT/IB2008/002485 claims priority to IT Application No. BO2007A000641 filed Sep. 24, 2007. The entire contents of this application are incorporated herein by reference.

The present invention relates to an apparatus and a method for weighing containers, in particular containers intended for being filled with pharmaceutical products or cosmetic products in an automatic filling machine.

Automatic filling machines are known that are configured for dosing liquid or powder products in containers, such as bottles, pill bottles, ampoules, vials and the like, and are provided with weighing apparatuses that are able to control the weight of the products dispensed inside said containers.

It is necessary to check the weight both in order to reject from production the containers that are non compliant because they contain a quantity of product that is in excess or insufficient with respect to a preset quantity and to correct possible excesses or defects in the dosage, for example by acting in feedback on a filling unit of the machine.

Above all in the pharmaceutical field, it is very important to check that the weight of the product introduced into the containers is exactly as requested, with a very close tolerance values.

Generally, in a filling machine there are provided two weighing stations provided with respective weighing apparatuses.

A first apparatus, placed at a first weighing station located upstream of a filling station, measures the weight of the empty containers (tare), whilst a second apparatus, placed at a second weighing station located downstream of the filling station, measures the gross weight of the filled containers. The difference between the two measured weights enables the net weight of the dosed product to be determined.

In order to weigh a container, the container has to be transferred from a conveying line of the filling machine to the weighing station, deposited on a suitable resting plane of a load cell or scales for a time that is necessary to measure the weight of the container precisely.

When measuring has finished, if the weighed container is not conformant it can be rejected directly or be reinserted into the conveying line and be subsequently rejected. If conformant, the weighed container is reinserted into the conveying line and continues its path through the machine.

In filling machines provided with indexed intermittent advancing motion the operations of removal, weighing and reinsertion of the container occur during the waiting or stop phases of the intermittent motion of the machine.

In this manner it is in theory possible to weigh all the containers located on the conveying line. Nevertheless, this would entail low advance speeds, i.e. machine productivity that is low and not always suitable for industrial needs.

These weighing apparatuses thus have the drawback of being able to be used only for performing a statistical or partial weight check, which enables only some of the containers on the conveying line that have been removed at random to be weighed with extreme precision and accuracy.

In this case, the stop phase in the indexed intermittent motion of the filling machine enables the containers to be removed from or inserted into the conveyor.

The containers, once weighed, are returned to the conveyor and inserted into corresponding spaces or empty housings of the conveyor, the spaces being created by appropriately interrupting the supply of the containers upstream of the weighing station.

In this manner, on the conveyor, between the two weighing stations, one or more gaps are created in the row of containers, in other words one or more empty spaces on the conveyor line are created.

Nevertheless, inhibiting the dosing in the absence of a container can cause an alteration to the next dosing that cannot be checked as a weight.

A further drawback of such apparatuses consists of the fact that the intermittent advance of the containers on the conveyor causes shaking of the product contained therein, shaking that is more or less marked according to the transfer speed, which for some products is contraindicated and inopportune.

Another drawback of such known weighing apparatuses is that they are not suitable for use on filling machines in which the dosage of the product cannot be inhibited if the containers lack, as occurs, for example, in some powder-product dosing machines.

Weighing apparatuses are known that are associable with filling machines provided with continuous advancing motion that enable a total weight check to be conducted, i.e. enable all the filled containers to be weighed.

In such apparatuses the resting plane of the scales is coplanar with the sliding or supporting plane of the containers in the conveying device. In this manner, the containers are weighed while they advance, sliding on the resting plane of the scales, moved by a suitable driving device, for example carousels or belts provided with housings.

A drawback of such apparatuses consists of the fact that they do not enable containers of reduced weight to be weighed with appropriate precision, typically containers of pharmaceutical products with a low dosage.

For such applications, in fact, it is necessary to use suitable scales, for example of the load cell type, so as measure very small weights with high levels of accuracy and precision.

These scales are extremely sensitive to mechanical vibrations and to the electrostatic charges that the conveying device and the corresponding containers thereupon can generate. It has been determined that load cells have to be located at a suitable distance from the conveying line of the machine that is suitably insulated from vibrations and electrostatic charges to avoid perturbations or alterations in measurements.

In addition to that, for a correct measurement it is necessary that between the deposit of the container on the resting plane and the measurement of the weight a preset minimum interval of time elapses to enable the vibrations to be dampened that are generated by resting the container on the resting plane.

This functional requisite is thus incompatible with weighing apparatuses with a continuous advancing motion like those disclosed above.

Apparatuses are further known that are able to measure the weight of the moving containers by using technologies based on magnetic resonance that do not require contact of the containers, i.e. the positioning of the containers on scales. Such apparatuses are therefore very costly and extremely laborious and complex to adjust and use. Further, it is not yet established whether the use of magnetic fields causes alterations and/or physical-chemical modifications in certain types of dosable products.

An object of the present invention is to improve known apparatuses and methods for weighing containers in an automatic filling machine, particularly for pharmaceutical and cosmetic use.

Another object is to provide an apparatus and method that enable a total weight check to be conducted, i.e. enable all the containers to be weighed that are moved by the conveying device of the filling machine at high speed both with continuous motion and with indexed intermittent motion.

A further object is to provide an apparatus and method that avoid having empty housings or spaces, i.e. missing containers, on the conveying device of the machine.

In a first aspect of the invention there is provided an apparatus for weighing containers moved by a transporting arrangement along a path in a weighing station, including a transferring arrangement for transferring containers from the transporting arrangement to the weighing station and vice versa, wherein the transferring arrangement is driven so as to move at least a container to be weighed away from an upstream row of containers for taking the at least a container to be weighed to the weighing station, maintaining the container to be weighed in the weighing station for a time necessary for detecting the weight of said the container to be weighed, and moving the weighed container towards a downstream row of containers.

In a second aspect of the invention there is provided a method for weighing containers, moved by a transporting arrangement along a path in a weighing station including transferring containers from the transporting arrangement to the weighing station and vice versa, wherein the transferring includes moving at least a container to be weighed away from an upstream row of containers for taking the container to be weighed to the weighing station, maintaining the container to be weighed in the weighing station for a time necessary for detecting the weight of the container to be weighed, and moving the weighed container towards a downstream row of containers.

As a result of these aspects of the invention, an apparatus and a method for weighing containers are made available that enable a total weight analysis to be conducted, i.e. enable the weight of all the containers moved by a transporting arrangement such as an automatic filing machine, to be measured with continuous motion at a preset advance speed.

The transferring arrangement, includes a plurality of independently driven gripping elements. In fact, during the same operating interval of the apparatus, the gripping elements enable a plurality of containers to be weighed to be removed from the upstream row of containers and transferred to the weighing station, maintaining a further plurality of containers to be weighed on a weighing device of the weighing station and transferring a plurality of weighed containers to be transferred to the downstream row of containers. Each gripping element is able to remove a number of containers equal to the number of containers with which the rows of containers advance on the transporting arrangement in the operating interval.

It is appropriate to observe that the independent movement of the gripping elements with different speeds not only enables the containers to be transferred from the transporting arrangement to the weighing station and vice versa, but also enables a weighing time to be obtained that is sufficient to detect the weight of the moved containers. This weighing time enables the containers to be moved by a positioning arrangement from a gripping element facing the weighing station to the weighing device of the weighing station and vice versa and enables the weighing device to measure the weight of the containers in a precise and accurate manner.

It is also provided that the apparatus can operate with the transporting arrangement driven with an indexed intermittent advancing motion. In this case, the operating interval of the transferring arrangement coincides with each of the advance steps of the indexed intermittent motion.

The invention can be better understood and implemented with reference to the attached drawings that show an embodiment thereof by way of non-limiting example, in which.

Figure 1:
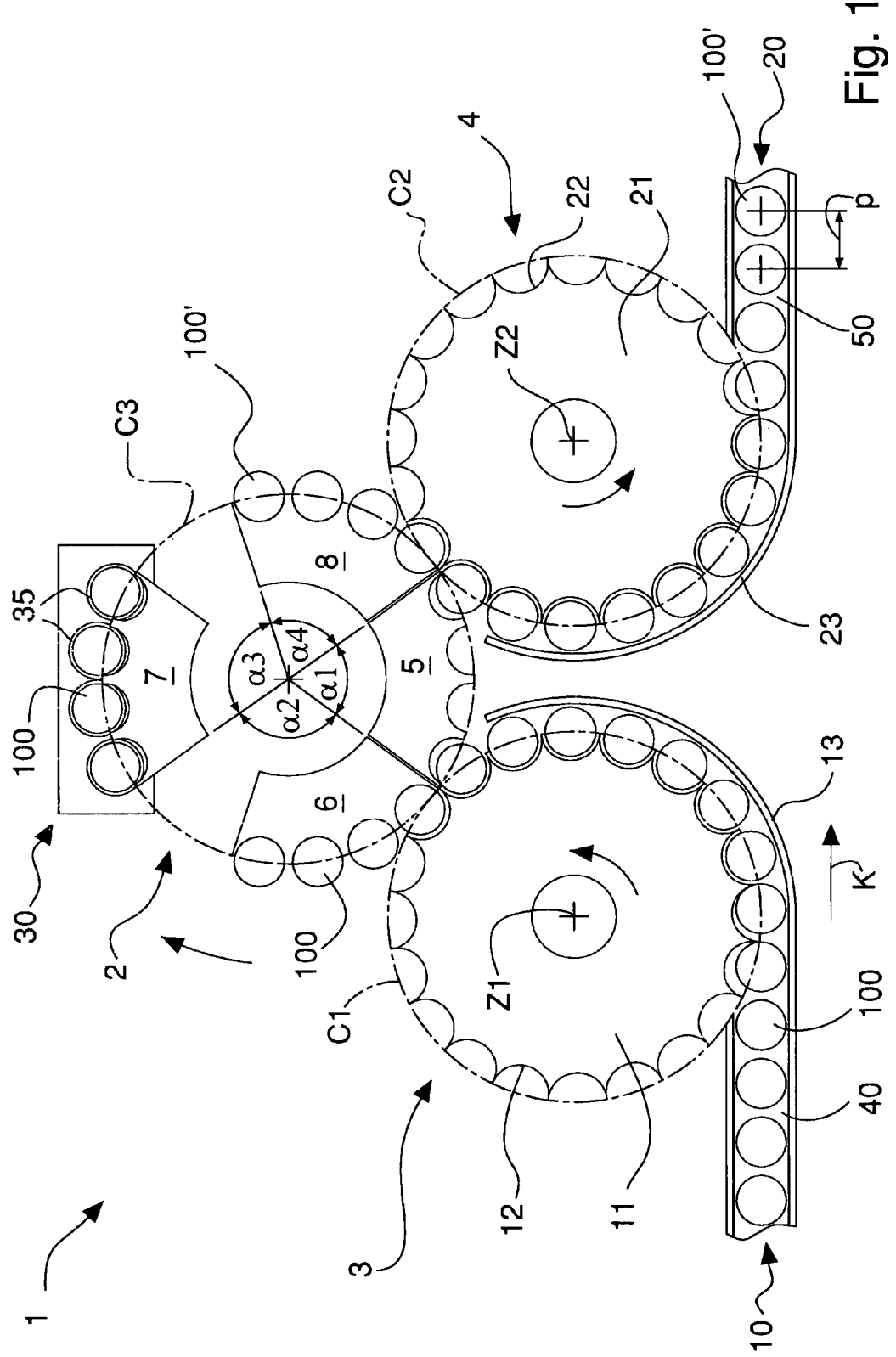
FIG. 1 is a schematic plan view of the apparatus for weighing containers of the invention in an operating condition.
Figure 2:
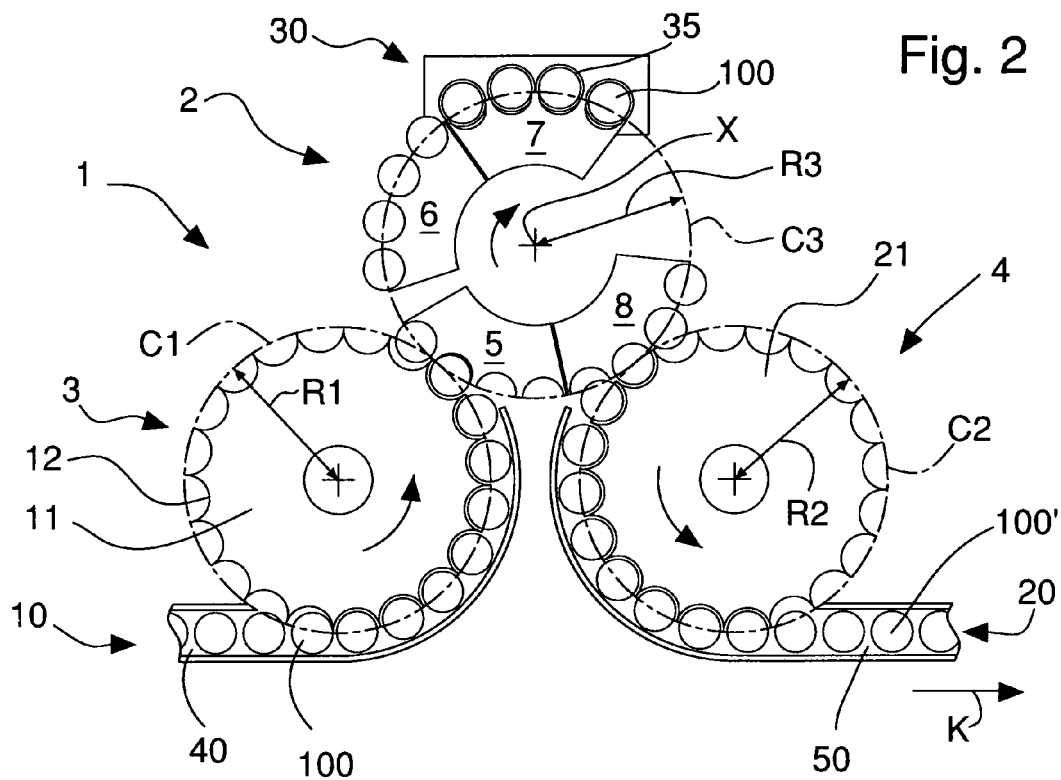
FIGS. 2 to 4 are views like that in FIG. 1, showing the apparatus in respective further operating conditions.
Figure 3:
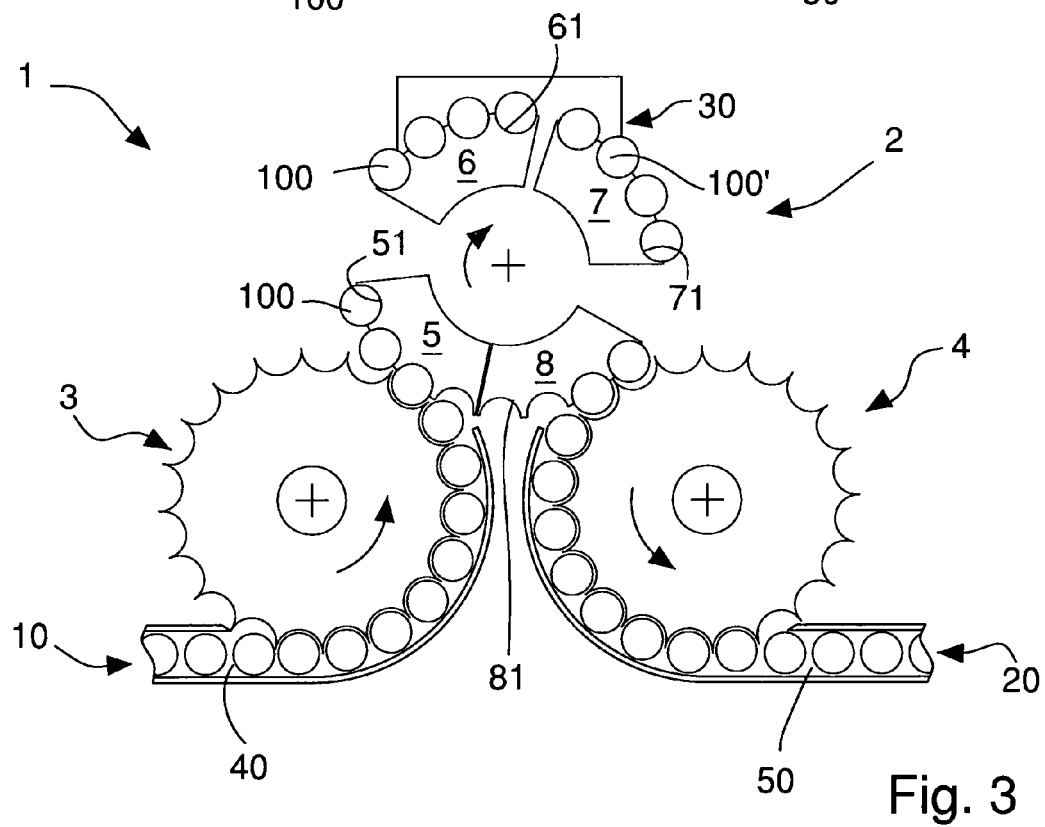

With reference to FIGS. 1 to 6, with 1 is indicated an apparatus for weighing containers 100 in a weighing station 30, said apparatus 1 being associable with an automatic filling machine that is of known type and is not illustrated in the figures.

The containers to be weighed 100 and the weighed containers 100' are moved by a transporting arrangement 40, 50 along a path, for example a rectilinear path, according to an advance direction K, with continuous motion at a defined advance speed Vt.

The apparatus 1 includes a transferring arrangement 2 for transferring the containers 100, 100' from the transporting arrangement 40, 50 to the weighing station 30 and vice versa, the transferring arrangement 2 being driven so as to move at least a container to be weighed 100 away from an upstream row of containers 10, which is upstream of the weighing station 30, for taking the container at the weighing station 30, maintaining the container in the weighing station 30 for a time necessary for detecting the weight of the container, and moving the weighed container 100' towards a downstream row of weighed containers 20.

The apparatus further includes a first conveying arrangement 3 and a second conveying arrangement 4 interposed between the transporting arrangement 40, 50 and the transferring arrangement 2.

The first conveying arrangement 3 conveys to the transferring arrangement 2 the containers of the upstream row 10, transported by a first transporting arrangement 40 along the advance direction K.

Figures 4, 5, 6:
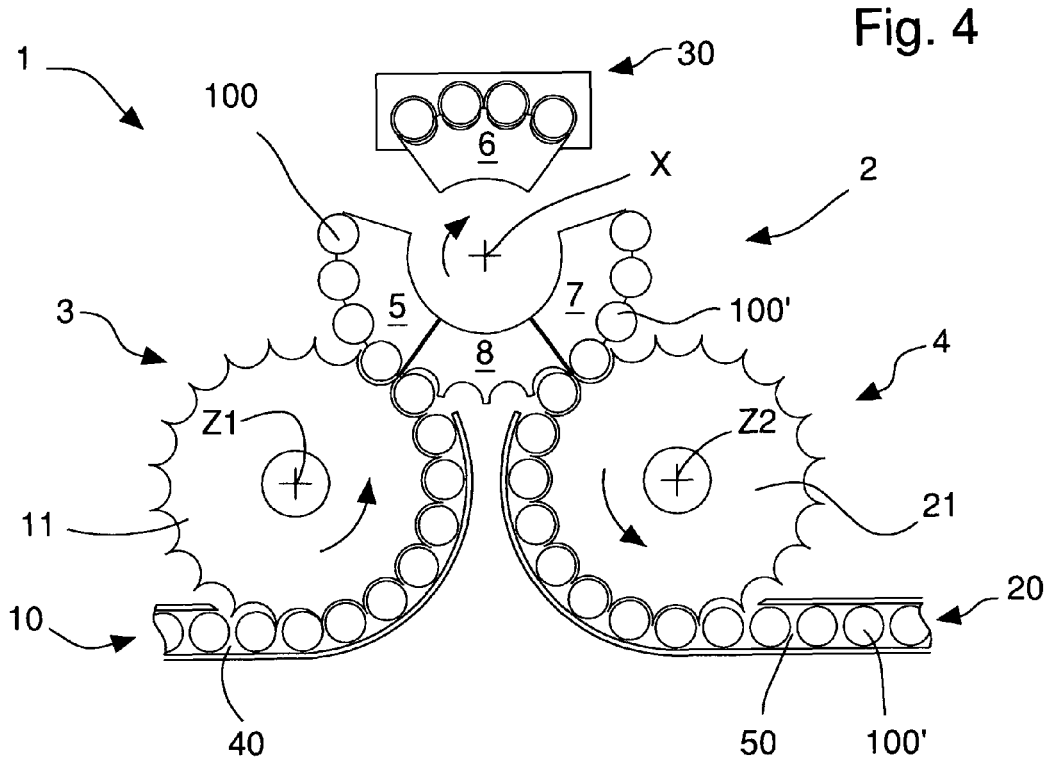
FIG. 5 is an enlarged schematic plan view of a gripping element of a transferring arrangement of the apparatus in FIG. 1 for transferring containers.
FIG. 6 is an enlarged schematic side view of a positioning arrangement for positioning containers from a gripping element to a weighing device of a weighing station.

The first conveying arrangement 3 includes a first conveying disc 11, rotating around a respective first axis Z1 and provided along a circumferential peripheral edge with a plurality of angularly equidistantly spaced first housings 12 configured for receiving the containers 100. The first axis Z1 is substantially orthogonal to a movement plane H on which the containers move (FIG. 6).

The first conveying disc 11 is rotated with continuous motion at an angular speed such that the containers 100, arranged in the respective seats 12 at a first distance R1 from the first axis Z1, are moved at a peripheral speed that is equal to the advance speed Vt that they have on the first transporting arrangement 40. In particular, the containers 100 are moved from the first conveying disc 11 along a first pitch circumference C1 having a radius R1.

The first conveying arrangement 3 further includes a first abutting guide 13 with an arched shape that is suitable for maintaining the containers 100 inside the first housings 12 during rotation of the first conveying disc 11.

The second conveying arrangement 4 includes a second conveying disc 21, rotating around a second axis Z2 and provided along a circumferential peripheral edge with a plurality of second housings 22, angularly equidistantly spaced and shaped for receiving the weighed containers 100' from the transferring arrangement 2. In particular, the second conveying disc 21, by rotating, removes from the transferring arrangement 2 the weighed containers 100' and transfers the weighed containers 100' to the second transporting arrangement 50.

The second axis Z2 is almost parallel to the first axis Z1.

The second transporting arrangement 50 moves the weighed containers 100' in the advance direction K, for example through the various operating stations of the filling machine, at the advance speed Vt.

The second transporting arrangement 50 includes, for example, a conveyor belt provided with a plurality of supports that are regularly spaced apart by a defined pitch p and are each, arranged for receiving a respective container.

The second conveying disc 21 is rotated with continuous motion at an angular speed such that the containers 100', arranged in the respective second housings 22 at a second distance R2 from the second rotation axis Z2, are moved at a peripheral speed equal to said advance speed Vt. In particular, the containers 100' are moved from the second conveying disc 21 along a second pitch circumference C2 having a radius R2.

The second conveying arrangement 4 includes a second abutting guide 23 with an arched shape, which is suitable for maintaining the containers 100' inside the second housings 22 during rotation of the second conveying disc 21.

In an embodiment of the apparatus that is not illustrated in the figures, the housings 12, 22 of the two conveying discs 11, 21 are provided with holes communicating with a suction source, for example a suction pump, so as to retain the containers 100, 100' without the need for abutting guides 13, 23.

The transferring arrangement 2 includes a plurality of gripping elements 5, 6, 7, 8, in particular four, rotating around a common rotation axis X in a same rotation direction and is configured for removing, retaining and selectively releasing the containers.

The rotation axis X is substantially parallel to the respective axes Z1, Z2 of the conveying arrangement 3, 4.

Each gripping element 5, 6, 7, 8, during rotation around the axis X, successively removes a set number N of containers to be weighed 100, for example four, from the first conveying arrangement 3, moves the N containers at the weighing station 30, waits for the N containers 100 to be weighed, moves the N weighed containers 100' at the second conveying arrangement 4 and transfers the weighed containers 100' to the second conveying arrangement 4.

The gripping elements 5, 6, 7, 8, as better explained below in the description, are driven independently so as to rotate at different angular speeds on the basis of the operating step to be performed.

For this purpose, a moving device that is known and not illustrated, including for example a mechanical or electronic cam, is provided for driving the gripping elements 5, 6, 7, 8.

Alternatively, each gripping element 5, 6, 7, 8 can be driven by a respective actuator, for example an electric motor.

Each gripping element 5, 6, 7, 8 has the shape of a circular sector, provided on an external peripheral edge with a plurality of seats 51, 61, 71, 81 that are similar to those of the conveying discs 11, 21 and are arranged for receiving respective containers 100, 100'. For this purpose, the seats 51, 61, 71, 81 of the gripping elements 5, 6, 7, 8 are positioned along a third pitch circumference C3, the centre of which is in the rotation axis X, the respective diameter R3 and is tangential to the pitch circumferences C1, C2 of the two conveying discs 11, 21.

The gripping elements 5, 6, 7, 8 of the transferring arrangement 2 and the conveying arrangement 3, 4 move the containers along a substantially curvilinear path coinciding with portions of the aforesaid pitch circumferences C1, C2, C3.

With particular reference to FIG. 5 in which there is illustrated a first gripping element 5 of the transferring arrangement 2, a retaining arrangement 52, 53, 54, 55, 18 is provided for removably locking the containers 100, 100' on the respective seats 51 of the gripping element 5 during the operation of the apparatus 1.

The retaining arrangement includes one or more suction holes 52 made in each seat 51 and flowingly connected by internal conduits 53 and external conduits with a suction device 18, including, for example, a suction pump. An adjusting arrangement 54, including valves or distributors is interposed between the internal conduits 53 and the external conduits 55 for selectively opening or closing the connection with the suction device 18 and enabling the gripping element 5, respectively, to remove and retain or release the containers.

In a version of the apparatus 1 that is not illustrated in the figures, the retaining arrangement includes further abutting guides with an arched shape that maintains the containers 100, 100' inside the seats 51, 61, 71, 81 of the respective gripping elements 5, 6, 7, 8, during the rotation of the containers 100, 100' around the rotation axis X.

As illustrated in FIG. 6, the apparatus 1 includes a positioning arrangement 17 arranged for removing the containers 100 from a gripping element, for example a third gripping element 7, stationary at the weighing station 30, and depositing the containers 100 on weighing or loading cells 35 of the containers 100 so that the containers 100 can be weighed. After weighing, the positioning arrangement 17 returns the weighed containers 100' to the gripping element 7.

The positioning arrangement 17 includes, for example, articulated quadrilateral supports that are able to lower or raise the containers 100, 100', maintaining the containers 100, 100' substantially erect, i.e. orthogonal, to the movement plane H.

The weighing station 30 comprises a number of weighing cells 35 equal at least to the number of the seats 51, 61, 71, 81 made on each gripping element 5, 6, 7, 8.

The operation of the weighing apparatus 1 causes the gripping elements 5, 6, 7, 8 of the transferring arrangement 2 to simultaneously move so that during the same operating interval T, a preset number N of containers 100, for example four, are removed by the first conveying arrangement 3 from the first transporting arrangement 40 and moved away from an upstream row of containers 10 N containers are weighed in the weighing station 30 and N weighed containers 100' are transferred by the second conveying arrangement 4 to the second transporting arrangement 50 and moved towards the downstream row of containers 20. In other words, the transferring arrangement 2 enables N containers to be moved away from an upstream row 10 and N containers to be moved again towards a downstream row 20 after weighing thereof, while the containers of these rows are moved with continuous motion at a preset constant advance speed Vt through the operating stations of the filling machine.

During the operating interval T each gripping element 5, 6, 7, 8, which moves N containers, runs one of the following operating steps: removal of the containers to be weighed 100 from the first conveying arrangement 3, movement of the containers to be weighed 100 at the weighing station 30, stop to enable the weighing cells 35 of the weighing station 30 to detect the weight of the containers 100 and subsequent moving away from the weighing station 30, and transfer of the weighed containers 100' to the second conveying arrangement 4.

In the operating interval T, N containers are moved by the second transporting arrangement 50 at the advance speed Vt by a quantity S that is equal to the product of the number N of containers by the pitch p by which they are spaced apart (S=N×p).

Each gripping element 5, 6, 7, 8 performs a rotation around the rotation axis X, for example clockwise with reference to the figures, at different angular speeds, on the basis of the operating position thereof, i.e. on the basis of the operating step to be performed.

With reference to FIGS. 1 and 4, there are illustrated respective positions assumed by the four gripping elements 5, 6, 7, 8 during an operating interval T.

A first gripping element 5 arranged for removing from the first conveying arrangement 3 the containers to be weighed 100 rotates at a constant first angular speed 1, so as to enable the seats 51 to move at a peripheral speed that is substantially the same as the advance speed Vt with which the containers 100 are moved by the first conveying arrangement 3, which rotates in an anticlockwise manner. In this manner, as the trajectory of the containers coincides with the pitch circumferences C1, C3 of the first conveying arrangement 3 and of the transferring arrangement 2, which are tangent one another at a point in which the transfer of the containers 100 occurs.

In this step, suction of the air through the suction holes 52 is activated to enable the seats 51 to retain the containers 100.

The progressive rotation of the first element 5 around the rotation axis X by a first angle $\alpha 1$ in the operating interval T enables the N containers 100 to be removed (FIG. 4).

A second gripping element 6 that retains in the respective seats 61 corresponding containers to be weighed 100, rotates at a variable speed so as to rotate by a second rotation angle $\alpha 2$, greater than the first angle $\alpha 1$, in the operating interval T.

In particular, the initial speed of the second element 6 is equal to the first angular speed $\omega 1$, whilst the final speed is equal to zero, when said second gripping element 6 is stopped at the weighing station 30.

During rotation, the element is rotated at a maximum second angular speed $\omega 2$, which is greater than the first angular speed $\omega 1$.

A third gripping element 7 is stopped for a weighing time Tp that is necessary for the positioning arrangement 17 to transfer the containers 100 from the aforementioned third gripping element 7 to the loading cells 35 of the weighing station 30 and vice versa, and to enable the loading cells 35 to detect the weight of the containers 100.

During the time T−Tp the third gripping element 7 is rotated at a speed that is variable from a first initial nil value to a final value coinciding with the first angular speed $\omega 1$. The profile of the rotation speed of the third gripping element 7 in the time T−Tp is such as to enable. rotating by a third angle $\alpha 3$, which is substantially equal to said second rotation angle $\alpha 2$.

The fourth gripping element 8 rotates at a speed equal to the first constant angular speed 1 so as to enable the weighed containers 100', housed in the respective seats 81, to move at a peripheral speed substantially equal to the advance speed Vt at which the second housing 22 of the second conveying disc 21 moves, which rotates in an counterclockwise manner. As the trajectory of the weighed containers 100' and of the second housings 22 coincide respectively with the pitch circumferences C3, C2 of the transferring arrangement 2 and of the second conveying disc 21 that are tangent one another at one point, in that point the transfer of the containers 100' occurs.

The progressive rotation of the fourth gripping element 8 around the rotation axis X by a fourth angle 4 which is substantially the same as the first rotation angle 1, in the operating interval T, enables the N weighed containers 100' to be transferred progressively to the second conveying arrangement 4.

During rotation, suction of the air from the holes of the seats 81 of the fourth gripping element 8 is progressively interrupted by the respective distributing element to enable the weighed containers 100' to be transferred to the second housings 22 of the second conveying disc 21.

As a result of the different angular speeds at which the gripping elements 5, 6, 7, 8 rotate in the various operating steps, apparatus 1 of the invention enables a total weight check to be conducted, i.e. enables all the containers moved by the transporting arrangement 40, 50 with continuous advancing motion at a preset advance speed Vt to be weighed. In this manner, the containers are moved through the different operating stations of the machine with continuous motion, without the product present therein undergoing undesired shaking.

The independent movement of the gripping elements 5, 6, 7, 8 not only enables the containers to be transferred from the conveying arrangement 3, 4 to the weighing station 30 and vice versa, but also enables the weighing time Tp to be obtained that is necessary for measuring the weight of the moved containers. The weighing time Tp is such as to enable the positioning arrangement 17 to move the containers 100 from the gripping element facing the weighing station 30 to the weighing cells 35 and vice versa and to enable the weighing cells 35 to measure the weight of the containers in a precise and accurate manner.

It is also provided for the apparatus to be able to operate with the transporting arrangement 40, 50 driven with indexed intermittent steps. In this case, the rotation of the transferring arrangement 2 and of the conveying arrangement 3, 4 occurs during the advance steps of the indexed intermittent motion, the operating interval T coinciding with the advance steps. The containers are advanced at an advance speed Vt by a quantity S equal to the product of the number N of containers by the pitch p with which they are spaced apart (S=N×p).

It is provided that the number of the gripping elements of the transferring arrangement 2 may be other than four, for example three or more than four. In this case, the extent of the rotation angles of each gripping element around the axis X and the corresponding angular speeds will vary in a suitable manner.

The angles and rotation speeds further depend on the dimensions of the gripping elements and of the conveying arrangement, and on the mutual position thereof.

In a version of the apparatus that is not illustrated, the transferring arrangement 2 includes gripping elements that are able to move the containers 100, 100' along a substantially rectilinear path. Such gripping elements may, for example, include flexible elements closed in a ring and provided with seats for the containers, which are movable at speeds that are such as to enable at least a container 100 to be weighed, to be moved away from the upstream row of containers 10 to take the container to the weighing station 30, a container 100 to be weighed to be maintained in the weighing station 30 for the time that is necessary to detect the weight of the container, and a weighed container 100' to be moved towards a downstream row of containers 20.

The invention claimed is:

1. Apparatus for weighing containers moved by first and second transporting arrangements along a path in a weighing station, comprising a transferring arrangement for transferring all containers from said transporting arrangement to said weighing station and from said weighing station to said second transporting arrangement, wherein said transferring arrangement is driven so as to move at least a container to be weighed away from an upstream row of containers for taking said container to be weighed to said weighing station, stopping and maintaining said container to be weighed in said weighing station for a time necessary for detecting the weight of said container to be weighed, and moving said weighed container towards a downstream row of containers, said transferring arrangement comprising a plurality of gripping elements each of which is suitable for supporting at least a container, wherein said apparatus comprises a driving device arranged for independently moving said gripping elements at different angular speeds.

2. Apparatus according to claim 1, wherein said gripping elements are driven independently so that in an operating interval of said apparatus, in which at least a container is advanced by said transporting arrangement, said gripping elements simultaneously removing a container to be weighed from a first transporting arrangement, maintaining a further container to be weighed on a weighing device of said weighing station and transferring at least a weighed container to a second transporting arrangement.

3. Apparatus according to claim 2, comprising a first conveying arrangement for removing said containers to be weighed from said first transporting arrangement and conveying said containers to be weighed to said transferring arrangement.

4. Apparatus according to claim 3, comprising a second conveying arrangement for receiving said weighed containers from said transferring arrangement and for conveying said weighed containers to said second transporting arrangement.

5. Apparatus according to claim 4, wherein said conveying arrangement comprises respective conveying discs rotating around respective axes and peripherally provided with a plurality of housings that are angularly spaced apart from one another and are suitable for receiving said containers.

6. Apparatus according to claim 5, wherein said conveying discs are rotated at an angular speed that is such as to move the containers received in said housings at a peripheral speed that is substantially the same as an advance speed of said containers on said transporting arrangement.

7. Apparatus according to claim 5, wherein said conveying discs move said containers along arched trajectories that substantially coincide with portions of pitch circumferences of said conveying discs.

8. Apparatus according to claim 7, wherein said gripping elements are movable around a rotation axis so as to move said containers along a substantially circular trajectory and which is substantially tangent to said pitch circumferences of said conveying discs.

9. Apparatus according to claim 8, wherein each gripping element has a shape of a circular sector and is provided on a peripheral edge with at least a seat that is suitable for receiving a container.

10. Apparatus according to claim 9, wherein each gripping element is provided on said peripheral edge with a plurality of seats that are angularly spaced apart from one another.

11. Apparatus according to claim 9, wherein each gripping element comprises a retaining arrangement for removably locking each container to the respective seat during the operation of said apparatus.

12. Apparatus according to claim 11, wherein said retaining arrangement comprises a suction hole made on said seat and connected to a suction device by a conduit.

13. Apparatus according to claim 12, wherein said retaining arrangement further comprises an adjusting arrangement interposed between said suction hole and said conduit for selectively opening or closing the connection to said suction device, so as to enable a corresponding gripping element respectively to remove and retain, or release, said containers.

14. Apparatus according to claim 8, wherein each gripping element is rotated in an operating interval by a first angle at a substantially constant angular speed and such as to enable said gripping element to remove at least a container to be weighed from said first conveying arrangement.

15. Apparatus according to claim 8, wherein each gripping element is rotated in an operating interval by a second angle at a variable angular speed so as to move said container to be weighed from said first conveying arrangement to said weighing station.

16. Apparatus according to claim 8, wherein each gripping element in an operating interval is stopped for a weighing time that is necessary for said weighing station to weigh said container and then is rotated by a third angle at a variable angular speed so as to move said weighed container from said weighing station to said second conveying arrangement.

17. Apparatus according to claim 8, wherein each gripping element is rotated in an operating interval by a fourth angle at a substantially constant angular speed and so as to enable said gripping element to transfer said weighed container to said second conveying arrangement.

18. Apparatus according to claim 1, comprising a positioning arrangement for transferring at least a container from a gripping element to a weighing device of said weighing station and vice versa.

19. Apparatus according to claim 18, wherein said weighing device comprises at least a weighing cell.

20. Apparatus according to claim 18, wherein each gripping element is provided on said peripheral edge with a plurality of seats that are angularly spaced apart from one another and wherein said weighing device comprises a number of weighing cells equal to the number of said plurality of seats of each gripping element.

21. Apparatus according to claim 1, wherein said transporting arrangement moves said containers with continuous motion at a set advance speed.

22. Apparatus according to claim 1, wherein said transporting arrangement moves said containers with indexed intermittent motion at a set advance speed.

23. Method for weighing containers, moved by a first and second transporting arrangements along a path, in a weighing station, comprising the steps of transferring all containers from said first transporting arrangement to said weighing station and from said weighing station to said second transporting arrangement by a transfer arrangement that includes a plurality of gripping elements, each of which is suitable for supporting at least a container, wherein said transferring comprises moving at least a container to be weighed to said weighing station, stopping and maintaining said container to be weighed in said weighing station for a time necessary for detecting the weight of said container to be weighed, moving said weighed container towards a downstream row of containers, wherein said gripping elements are moved independently by a driving device at different angular speeds.

24. Method according to claim 23, wherein said moving away step comprises deviating said containers from a substantially rectilinear path of said transporting arrangement.

25. Method according to claim 23, wherein moving said rows of containers by said transporting arrangement with a continuous or indexed intermittent advancing motion is provided.

26. Method according to claim 25, wherein moving said rows of containers at a defined advance speed is provided.

27. Method according to claim 23, wherein said moving away, maintaining and moving towards steps are performed simultaneously in a same operating interval.

28. Method according to claim 27, wherein moving said rows of containers by said transporting arrangement with a continuous or indexed intermittent advancing motion is provided and wherein said moving said rows of containers comprises advancing said rows of containers at each interval of time by a number of containers equal to the number of containers that it is intended to move away, maintain and move towards.

29. Method according to claim 27, wherein said moving away step comprises removing a plurality of containers to be weighed from said upstream row moved by a first transporting arrangement and transferring said plurality of containers to be weighed to said weighing station.

30. Method according to claim 27, wherein said maintaining step comprises transferring a further plurality of containers to be weighed on a weighing device of said weighing station for a weighing time that is necessary for said weighing device to weigh said further plurality of containers to be weighed.

31. Method according to claim 30, wherein said weighing time is less than said operating interval.

32. Method according to claim 27, wherein said moving towards step comprises removing a plurality of containers to be weighed from said weighing station and transferring the plurality of containers to be weighed to a second transporting arrangement arranged for supporting and moving said downstream row of containers.

* * * * *